United States Patent [19]

Carette et al.

[11] Patent Number: 5,143,959

[45] Date of Patent: Sep. 1, 1992

[54] COMPOSITIONS FOR USE WITH CHLORINATED POLYMERS

[75] Inventors: Louis Carette, Issy Les Moulineaux; Gerard Velleret, Paris, both of France

[73] Assignee: Rhone-Poulenc Chimie, Courbevoie, France

[21] Appl. No.: 687,518

[22] Filed: Apr. 19, 1991

[30] Foreign Application Priority Data

Apr. 20, 1990 [FR] France .................... 90 05295

[51] Int. Cl.⁵ .................... C08J 3/20; C08K 5/54; C08L 83/06
[52] U.S. Cl. .................... 524/267; 524/398; 524/399; 524/400; 524/403; 524/423; 524/424; 252/400.3; 252/400.31
[58] Field of Search ............... 524/267, 423, 424, 265, 524/399, 398, 400, 403

[56] References Cited

U.S. PATENT DOCUMENTS 3,869,420 3/1975 Mathis et al. .
4,083,789 4/1978 Morgan et al. .
4,102,839 7/1978 Chrochemore et al. .
4,751,261 6/1988 Miyata et al. .................... 524/357
4,808,649 2/1989 Gay et al. .

FOREIGN PATENT DOCUMENTS 0040286 11/1981 European Pat. Off. .
0046161 2/1982 European Pat. Off. .
1420977 1/1976 United Kingdom .

OTHER PUBLICATIONS

Chemical Abstracts, vol. 90, No. 10, Mar. 5, 1979, Columbus, Ohio, p. 37, Reg. No. 72922H; Japanese Patent Document No. 53-129278, dated Nov. 11, 1978, Tokuyama Sekisui Kogyo Co., Ltd.

Primary Examiner—Paul R. Michl
Assistant Examiner—U. K. Rajguru
Attorney, Agent, or Firm—Finnegan, Henderson, Farabow, Garrett and Dunner

[57] ABSTRACT

A novel composition for use in chlorinated polymers comprising:
  a) dawsonite, hydrotalcite or a mixture thereof,
  b) a (γ-hydroxyalkyl)polyorganosiloxane oil,
  c) an organic zinc compound, and
  d) an organic calcium, magnesium, barium or lanthanide compound, or a mixture thereof is disclosed, The presence of the polyorganosiloxane oil enables the content of epoxidized oils to be decreased while preserving the thermal stability of the polymer composition.

The impact strength of shaped articles prepared from polymers containing compositions of the present invention is also enhanced.

22 Claims, No Drawings

COMPOSITIONS FOR USE WITH CHLORINATED POLYMERS

FIELD OF INVENTION

The present invention relates to novel compositions, and more specifically relates to novel compositions for use in chlorinated polymers.

BACKGROUND OF INVENTION

Depending on the applications envisaged, thermal stabilization during shaping or during the use of the corresponding products is carried out in various ways.

French Patent FR-A-2,297,227 describes PVC compositions stabilized effectively by metal-organic salts such as, salts of zinc, calcium and barium and β-diketones.

These compositions also contain common additives such as epoxidized oils, lubricants, plasticizers or impact strength enhancing agents.

For some applications, especially those for which the chlorinated polymer has to be plasticized to only a small extent, if at all, the customary presence of relatively large amounts of epoxidized oil, such as epoxidized soybean oil or epoxidized linseed oil, in the polymer, tends to lower the softening point of the polymer.

In fact, the elimination or a significant decrease in the content of these epoxidized oils decreases the thermal stability of the polymer compositions.

This manifests itself, during thermo-forming of the compositions, in a substantial yellowing of the polymer, which is unacceptable for applications requiring transparency and a colorless or only slightly colored appearance of the shaped article, for example, in the case of PVC containers.

SUMMARY OF THE INVENTION

One object of the present invention is directed towards a solution to the above-described problem, thus enabling the content of epoxidized oils to be decreased while preserving the thermal stability of polymer compositions.

Another object of the present invention is directed to enabling the amount of liquid lubricants and/or those having a low softening point, such as hydrogenated castor oil, which are liable to lower the softening point of the polymer, to be decreased significantly in the polymer compositions.

A further object of the present invention is providing a composition which enhances the impact strength of shaped articles prepared.

Additional objects and advantages of the present invention will be set forth in part in the description which follows, and in part will be obvious from the description, or may be learned by practice of the present invention. The objects and advantages of the present invention will be realized and attained by means of the elements and combinations particularly pointed out in the appended claims.

To achieve the objects and in accordance with the purpose of the present invention, as embodied and broadly described herein, the present invention comprises a composition comprising:

a) an effective amount of a dawsonite, hydrotalcite, or a mixture thereof;

b) an effective amount of a (γ-hydroxyalkyl)polyorganosiloxane oil of general formula (I):

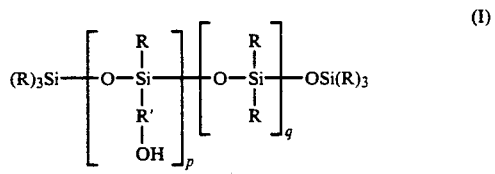

wherein,
R' which may be the same or different, represents a methyl or phenyl radical, with at least 60 mol% of R being methyl radicals,
R' represents a linear or branched alkylene radical having 2 to 6 carbon atoms,
p represents an average number from 1 to 30, and
q represents an average number from 1 to 100, c) an effective amount of an organic zinc compound, and d) an effective amount of an organic calcium, magnesium, barium or lanthanide compound or a mixture thereof.

It is to be understood that both the foregoing general description and the following detailed description are exemplary and explanatory only and are not restrictive of the present invention, as claimed.

DETAILED DESCRIPTION OF THE INVENTION

Generally, any chlorinated polymers can be used with the present invention. For example, polyvinyl chloride (PVC) and polyvinylidene chloride, copolymers predominantly containing vinyl chloride units obtained from vinyl chloride and other monomers, and mixtures of polymers or copolymers of which a predominant part is obtained from vinyl chloride can be used.

Any type of PVC is suitable, irrespective of its method of preparation, namely bulk, suspension or dispersion polymerization or any other type of polymerization, and irrespective of its intrinsic viscosity.

The vinyl chloride homopolymers may also be chemically modified, for example, by chlorination.

Many vinyl chloride copolymers may also be stabilized against the effects of heat, e.g., yellowing and degradation, by the compositions of the present invention. In particular, the copolymers obtained by copolymerization of vinyl chloride with other monomers possessing a polymerizable ethylenic bond, for example, vinyl acetate or vinylidene chloride; maleic or fumaric acid or their esters; olefins such as ethylene, propylene, hexene; acrylic or methacrylic esters; styrene; and vinyl ethers such as vinyl dodecyl ether can be stabilized by the compositions of the present invention.

Customarily, these copolymers contain at least 50% by weight of vinyl chloride units and preferably at least 80% by weight of vinyl chloride units.

The compositions according to the present invention can also contain chlorinated polymers containing minor amounts of other polymers, such as halogenated polyolefins or acrylonitrile/butadiene/styrene copolymers.

PVC alone or mixed with other polymers is the most chlorinated polymer most widely used in the compositions of the present invention.

In the composition of the present invention, a (γ-hydroxyalkyl) polyorganosiloxane oil is used, wherein the polyorganosiloxane oil is of general formula (I):

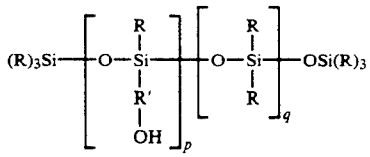

(I)

wherein,
R' which may be the same or different, represents a methyl or phenyl radical, with at least 60 mol % of R being methyl radicals,
R' represents a linear or branched alkylene radical having 2 to 6 carbon atoms,
p represents an average number from 1 to 30, and
q represents an average number from 1 to 100.

Among these polyorganosiloxane oils, preference is given in the present invention to the oils of formula (I) in which:
R represents a methyl radical;
R' represents a trimethylene or 2-methyltrimethylene radical;
p represents an average number from 2 to 20; and
q represents an average number from 2 to 30.

(The term "average" is used because the polyorganosiloxanic oils are polymer compounds with different molecular weights and different numbers of units statistically distributed along the polymeric chain, and thus p and q are an average number between the numbers and units in the different polymeric compounds.)

In general, the compositions of the present invention contain from 0.005% to 5% by weight of the polyorganosiloxane oil relative to the weight of the chlorinated polymer used, and preferably from 0.01% to 2% by weight.

Any organic zinc compound may be used in the present invention, but preferred are zinc carboxylates and phenolates.

The zinc salts of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acids; and the zinc phenolates of phenol and of phenols substituted with one or more alkyl radicals, such as nonylphenols are common examples.

On practical grounds or on economic grounds, zinc propionate, zinc 2-ethylhexanoate, zinc laurate, zinc stearate, zinc oleate, zinc ricinoleate, zinc benzoate, zinc para-tert-butylbenzoate, zinc salicylate, zinc mono(2-ethylhexyl) maleate and zinc nonylphenates are more preferred among the organic zinc compounds mentioned above.

In general, the organic zinc compounds are present in the amount of from 0.005% to 1% by weight relative to the chlorinated polymer used, and preferably from 0.01% to 0.6% by weight.

Any organic calcium, magnesium, barium and lanthanide compound or a mixture thereof can be used, but preferably the carboxylates and phenolates of these metals are used.

Most commonly used are, for example, the calcium, magnesium, barium and lanthanide salts of maleic, acetic, diacetic, propionic, hexanoic, 2-ethylhexanoic, decanoic, undecanoic, lauric, myristic, palmitic, stearic, oleic, ricinoleic, behenic, hydroxystearic, hydroxyundecanoic, benzoic, phenylacetic, para-tert-butylbenzoic and salicylic acids; and the calcium, magnesium, barium and lanthanide phenolates of phenol and of phenols substituted with one or more alkyl radicals, such as nonylphenols.

On practical grounds or on economic grounds, the salts of propionic, 2-ethylhexanoic, lauric, stearic, oleic, ricinoleic, benzoic, para-tert-butylbenzoic and salicylic acids and the mono(2-ethylhexyl) maleates are more preferred among the organic calcium, magnesium, barium and lanthanide compounds mentioned above, as are the nonylphenates of these metals.

In general, the organic calcium, magnesium, barium or lanthanide compound or mixture thereof is present in the amount of from 0.005% to 5% by weight relative to the weight of the chlorinated polymer used, and preferably from 0.02% to 2% by weight.

For applications involving foodstuffs, and in particular for the manufacturing of PVC bottles, the organic calcium compounds or mixtures of the organic calcium compounds and organic magnesium compounds are used.

Dawsonite is a basic aluminum sodium carbonate. It is a monoclinic crystalline carbonate generally represented by the formula $NaAl(OH)_2CO_3$, with this representation not necessarily being the only one possible.

Reference may be made to general works on inorganic chemistry, such as, for example, the "NOUVEAU TRAITE DE CHIMIE MINERALE, TOME II" (New Treatise on Inorganic Chemistry) by P. PASCAL.

Hydrotalcites are natural or synthetic crystalline compounds of magnesium and aluminum, generally represented by the following general formula (II):

$$Mg_{1-x}(OH)_2 \cdot A_{x/2} mH_2O \quad \text{(II)}$$

wherein
$0 < X \leq 0.5$,
A represents $CO_3^{2-}$ or $SO_4^{2-}$ and
m represents the number of molecules of water of crystallization.

For the preparation of hydrotalcites, reference may be made, no limitation being implied, to U.S. Pat. No. 3,650,704.

In general, the compositions according to the present invention contain from 0.005% to 5% by weight of dawsonite, hydrotalcite or a mixture thereof relative to the weight of the chlorinated polymer used, and preferably from 0.01% to 2% by weight.

The compositions according to the present invention display a thermal stability, in particular, during their shaping, essentially equivalent to similar compositions containing larger amounts of epoxidized soybean oil, as well as a similar lubricant nature, whereas they possess a higher viscosity number.

Other additives can be added into the compositions of the present invention based on the chlorinated polymer used.

This applies, in particular, to β-diketones or β-keto aldehydes.

These β-diketones have been described, in particular, in French Patents and Certificates of Addition published under the Nos. FR 2,292,227, FR 2,324,681, FR 2,351,149, FR 2,352,025, FR 2,383,988 and FR 2,456,132, and in European Patents EP 0,040,286 and EP 0,046,161.

Examples of such β-diketones include, but are not limited to, benzoylstearoylmethane, dibenzoylmethane, benzoylacetone, benzoyl-(3-methylbutanoyl)methane, (methoxycarbonylbenzoyl)benzoylmethanes and bis(β-diketones) such as 1,4-is(acetoacetyl)butane, 1,8-bis(-benzoylacetyl)octane and 1,4-bis(acetoacetyl)benzene.

When used, the β-diketones are present in the amount of from 0.005 % to 5 % by weight relative to the weight of the chlorinated polymer used, and preferably from 0.01 % to 2 % by weight.

1,4-Dihydropyridines are also organic stabilizers which can be used in the compositions of the present invention.

These compounds are generally 1,4-dihydro-2,6-dimethyl-3,5-pyridinedicarboxylates, monomeric such as those described in French Patents FR-A-2,239,496, FR-A-2,405,974 and FR-A-2,405,937, or polymeric as described in European Patent EP-A-286,887.

Usually, these 1,4-dihydropyridines are effective at contents of from 0.01% to 5% by weight relative to the weight of chlorinated polymer used, and preferably from 0.05% to 2% weight/weight.

The compositions of the present invention can contain other secondary thermal stabilizers such as polyols and phosphites.

Polyols generally have the advantage of prolonging the life of the chlorinated polymers subjected to a heat treatment.

In general, it is preferable that the polyols used have a boiling point above 150° C., and preferably above 170° C., on account of the high-temperature processing of chlorinated polymers.

Examples of such polyols include, but are not limited to, triols such as trimethylolpropane, glycerol, 1,2,6-hexanetriol, 1,2,4-butanetriol, tris(hydroxyethyl-)isocyanurate; tetrols such as pentaerythritol, diglycerol; pentitols such as xylitol, tetramethylolcyclohexanol; hexitols such as mannitol, sorbitol, dipentaerythritol; polyols partially esterified with a carboxylic acid, and in formulas of which at least 3 hydroxyl functions are free; and polyvinyl alcohols, in particular those in which there remains less than 30 mol% of ester groups relative to their total content of ester and hydroxyl groups.

Among these polyols, xylitol, mannitol, sorbitol, tetramethylolcyclohexanol and the polyvinyl alcohols defined above are more preferred.

When used in the compositions according to the present invention, from 0.005% to 1% by weight of polyol relative to the chlorinated polymer is used, and preferably from 0.01% to 0.6% by weight is used.

The compositions according to the present invention can also contain organic phosphites, in particular, aliphatic phosphites or aromatic phosphites or mixed aliphatic and aromatic phosphites.

When present, the phosphites are used in the amount of from 0.05% to 5% by weight relative to the chlorinated polymer used, and preferably from 0.1% to 2% by weight.

The compositions according to the present invention can also contain customary additives such as phenolic antioxidants; and UV protecting agents such as benzophenones, benzotriazoles or sterically hindered amines (usually known by the term HALS).

The compositions of the present invention can also contain epoxides, in particular epoxidized polyglycerides such as epoxidized soybean oil, epoxidized linseed oil, epoxidized fish oils or epoxidized tall oil.

However, to avoid a decrease in the viscosity number of the chlorinated polymer, as little as possible of such oils is generally used, depending on the use envisaged for the compositions.

Usually, when present, the epoxides represent from 0.05% to 5% by weight relative to the weight of the chlorinated polymer, and more specifically from 0.1% to 2% by weight.

The compositions of the present invention are generally rigid formulations, i.e., without a plasticizer, or semirigid formulations, i.e., with reduced plasticizer contents, such as for applications in building or for the manufacture of bottles. However, the compositions according to the present invention can also be used in plasticized formulations, such as for the manufacture of films for agricultural use.

Usually, the incorporation of the various stabilizers or additives is carried out on the chlorinated polymer in the powder state.

It is naturally possible to prepare a mixture of two or more compositions of the present invention before their incorporation into the chlorinated polymer.

All of the conventional methods of incorporation of the various components, stabilizers and/or additives into the polymer can be used. For example, the homogenization of the polymer composition may be carried out on a roller mixer or mill, at a temperature such that the composition becomes fluid, normally between 150° C. and 200° C. for PVC, and for a sufficient time, of the order of a few minutes to perhaps 20°-30 minutes or more.

The compositions including the chlorinated polymer, and more especially including PVC, may be processed according to all the customarily used techniques, such as, for example, extrusion, injection, extrusion blow molding, calendering or rotational molding.

As stated above, the shaped articles obtained from using compositions of the present invention display an improved impact strength compared with the shaped articles prepared with similar compositions without polyorganosiloxane oil.

The present invention will be further clarified by the following examples, which are intended to be purely exemplary of the invention.

EXAMPLE 1

The three formulations A, B, C detailed in Table I below were prepared.

TABLE 1

| COMPOUND | Composition A | Composition B | Composition C |
|---|---|---|---|
| PVC suspension SO 91* | 100 g | 100 g | 100 g |
| Impact strength enhancing agent (KM 334)** | 7 g | 7 g | 7 g |
| Processing aid (K 120 ND***) | 1 g | 1 g | 1 g |
| Ca stearate | 0.3 g | 0.3 g | 0.3 g |
| Zn stearate | 0.4 g | 0.4 g | 0.4 g |
| Dibenzoylmethane | 0.1 g | 0.1 g | 0.1 g |
| Polyvinyl alcohol (4/125****) | 0.1 g | 0.1 g | 0.1 g |
| Diisodecylphenyl phosphite | 0.5 g | 0.5 g | 0.5 g |
| TiO$_2$ | 4 g | 4 g | 4 g |
| CaCO$_3$ | 4 g | 4 g | 4 g |
| Hyrogenated castor oil | 1 g | 1 g | 0 |
| Compound of formula (I)***** | 0 | 0 | 0.2 g |
| Epoxidized soybean oil | 0 | 1 g | 0 |

TABLE 1-continued

| COMPOUND | Composition A | Composition B | Composition C |
|---|---|---|---|
| Dawsonite | 0.3 g | 0 | 0.2 g |

\* = PVC prepared in suspension, viscosity number = 91 K value = 60
\*\* = methacrylate/butadiene/styrene copolymer
\*\*\* = high molecular mass (>1,000,000) polyacrylic resin
\*\*\*\* = polyvinyl alcohol: ester number = 125 viscosity in 4% solution in water = 4 mPa · s
\*\*\*\*\* = compound (I) with each R = CH$_3$, R' = —(CH$_2$)$_3$—, p = 4.5, and q = 10.9

Lubrication

The effect of lubricants is studied in a Brabender plastograph.

The PVC and the additives were mixed beforehand in a rapid mixer at room temperature.

The time needed for good homogenization was approximately 5 min.

The homogeneous mixtures of powders were introduced into a plastograph consisting of a heated tank in which blades rotate in opposite directions in order to blend the polymer. On one of the blades, the load torque, which reflects the viscosity of the product as a function of time, was measured.

At the time of introduction of 33 g of the mixture under a load of 5 kg, a rapid and short-lived change in the torque was recorded at 180° C. This rise corresponded to the origin of the measurement, $t_o$.

During the test, a rise in the torque was noted at a time $t_1$, corresponding to intimate mixing of the PVC particles with one another (gelling).

An external lubricant had the effect of delaying gelling.

Some products (processing aid, internal lubricant, etc.), in contrast, decreased the gel time. Gel time ($= t_1 - t_o$):
 composition A: 38 s
 composition B: 38 s
 composition C: 38 s It was noted that the composition C displayed a lubrication equivalent to the compositions A and B, despite the elimination of hydrogenated castor oil.

VICAT softening point (Standards NF T 51-021, ISO 306, ASTM D 1525-76)

From the homogeneous mixtures prepared as described above, samples approximately 4 mm thick were prepared by means of blending on a roller mixer at a temperature of 180° C. for 5 min, and then by means of a press at 185° C. (2 min in contact, 2 min at 2.1 MPa).

VICAT conditions:
 fluid: silicone
 weight: 1 kg
 rate of temperature rise: 50° C./h The following VICAT softening points were obtained:
 composition A : 81° C.
 composition B : 81° C.
 composition C : 83° C.

This temperature difference was significant, and reflected a greater mechanical strength of composition C containing the composition of the present invention as a function of temperature.

Thermal stability

The thermal stability (time before blackening of the sample) was determined at 180° C. for each of the compositions B and C, on the 4 mm samples prepared above. The following results are obtained:
 composition B : 30 min
 composition C : 40 min It was noted that the composition C containing the composition the present invention displayed a higher thermal stability, despite the elimination of epoxidized soybean oil.

EXAMPLE 2

Three formulations D, E and F, the compositions of which are shown in Table II below, were prepared in the same manner as Example 1.

With each of these formulations, sheets 1 mm thick were prepared by blending/pressing under the following conditions:
 mixing on a roller mill (SCHWABENTAN brand) for 5 min at 180° C. (roller diameter = 100 mm, speed ratio = 1.25);
 pressing for 3 min at 190° C.

TABLE II

| COMPOUND | Composition D | Composition E | Composition F |
|---|---|---|---|
| PVC suspension SO 91 (a) | 100 g | 100 g | 100 g |
| Impact strength enhancing agent (KM 334) (b) | 7 g | 7 g | 7 g |
| Processing aid (K 120 ND) (c) | 0.5 g | 0.5 g | 0.5 g |
| Ca stearate | 0.23 g | 0.23 g | 0.23 g |
| Zn octanoate | 0.11 g | 0.11 g | 0.11 g |
| Dibenzoylmethane | 0.25 g | 0.25 g | 0.25 g |
| Epoxidized soybean oil | 3 g | 3 g | 3 g |
| Ester waxes (d) | 0.5 g | 0.1 g | 0.1 g |
| Wax A 316 (e) | 0.2 g | 0 g | 0 g |
| Hydrogenated castor oil | 1.3 g | 0.7 g | 0.7 g |
| Compound of formula (I) (f) | 0 g | 0.1 g | 0 g |
| Compound of formula (I) (g) | 0 g | 0 g | 0.2 g |
| Hydrotalcite | 0.6 g | 0.6 g | 0.6 g |

(a) = PVC prepared in suspension: viscosity number = 91 K-value = 60
(b) = methacrylate/butadiene/styrene copolymer
(c) = high molecular mass (>1,000,00) polyacrylic resin
(d) = montanic acid esters having a long hydrocarbon chain
(e) = oxidized polyethylene wax
(f) = compound (I) with each R = CH$_3$, R' = —(CH$_2$)$_3$—, p = 2.4, and q = 12.6
(g) = compound (I) with each R = CH$_3$, R' = —(CH$_2$)$_3$—, p = 4.5, and q = 10.9

Tensile impact measurement tests according to ASTM standard D1822 were performed on the sheets prepared as described above.

The following results were obtained:
 composition D: 375 kg/cm/cm$^2$
 composition E: 513 kg/cm/cm$^2$
 composition F: 672 kg/cm/cm$^2$ Comparison of the results obtained with formulation D and formulation E, and comparison of the results obtained with formulation D and formulation F, showed that, in a formula stabilized with an inorganic stabilizer (hydrotalcite), the replacement of a large part of the internal lubricant (hydrogenated castor oil), and virtually all of the ester waxes and all of the external lubricant (wax A 316) by a (gamma-hydroxyalkyl)-polyorganosiloxane oil enabled the tensile impact strength of PVC to be improved very significantly.

These results were obtained without impairing the lubrication. In effect, it was possible to prepare the sheets used for the tests without any sign of sticking or any delay in gelling on the rollers of the mill.

Other embodiments of the present invention will be apparent to those skilled in the art from consideration of the specification and practice of the present invention disclosed herein. It is intended that the specification and examples be considered as exemplary only, with a true scope and spirit of the invention being indicated by the following claims.

What is claimed is:

1. A composition comprising:
   a) dawsonite, hydrotalcite, or a mixture thereof,
   b) a (γ-hydroxyalkyl)polyorganosiloxane oil of general formula (I)

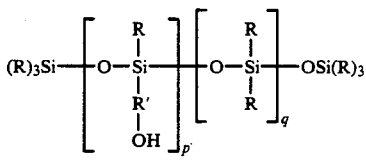

wherein,
   R, which may be the same or different, represent a methyl or phenyl radical, with at least 60 mol% of R being methyl radicals,
   R' represents a linear or branched alkylene radical having 2 to 6 carbon atoms,
   p represents an average number from 1 to 30, and
   q represents an average number from 1 to 100,
   c) an organic zinc compound, and
   d) an organic calcium, magnesium, barium or lanthanide compound, or a mixture thereof.

2. The composition of claim 1, further comprising a chlorinated polymer selected from the group consisting of polyvinyl chloride, polyvinylidene chloride, copolymers substantially containing vinyl chloride units obtained from vinyl chloride and other monomers, and mixtures of polymers or copolymers of which a predominant part is obtained from vinyl chloride.

3. The composition of claim 1 wherein in formula (I),
   R represents a methyl radical;
   R' represents a trimethylene or 2-methyltrimethylene radical;
   p represents an average number from 2 to 30; and
   'q represents an average number from 2 to 30.

4. The composition of claim 2 wherein said (γ-hydroxyalkyl) polyorganosiloxane oil is present in the amount of from 0.005% to 5% by weight relative to the weight of the chlorinated polymer used.

5. The composition of claim 1 wherein said organic zinc compound is a zinc carboxylate or zinc phenolate.

6. The composition claim 1 wherein said organic calcium, magnesium, barium and lanthanide compound or mixture thereof is of the carboxylate or phenolate form.

7. The composition of claim 2 wherein said organic zinc compound is present in the amount of from 0.005% to 1% by weight relative to the chlorinated polymer used.

8. The composition of claim 2, wherein organic calcium, magnesium, barium and lanthanide compound mixtures thereof is present in the amount of from 0.005 % to 5 % by weight relative to the weight of the chlorinated polymer used.

9. The composition of claim 2 wherein said dawsonite is present in the amount of from 0.005% to 5% by weight relative to the weight of the chlorinated polymer used.

10. The composition of claim 1 wherein said hydrotalcite is present in the amount of from 0.005% to 5% by weight relative to the weight of the chlorinated polymer used.

11. The composition of claim 1 further comprising at least β-diketone or one β-keto aldehyde.

12. The composition of claim 11, wherein said β-diketone is selected from the group consisting of benzoylstearoylmethane, dibenzoylmethane, benzoylacetone, benzoyl-(3-methylbutanoyl)methane, (methoxycarbonylbenzoyl)benzoylmethanes and bis(β-diketones).

13. The composition of claim 2 further comprising at least β-diketone or one -62 -keto aldehyde.

14. The composition of claim 1 further comprising at least one 1,4-dihydro-2,6-dimethyl-3,5-pyridinedicarboxylate.

15. The composition of claim 2 further comprising at least one 1,4-dihydro-2,6-dimethyl-3,5-pyridinedicarboxylate.

16. A stabilized composition comprising:
   a) a chlorinated polymer,
   b) dawsonite, hydrotalite or a mixture thereof,
   c) a (γ-hydroxylalkyl)polyorganosiloxane oil of general formula (I)

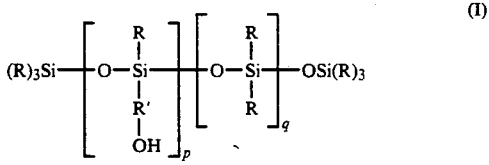

wherein,
   R, which may be the same or different, represent a methyl or phenyl radical, with at least 60 mol% of R being methyl radicals,
   R' represents a linear or branched alkylene radical having 2 to 6 carbon atoms,
   p represents an average number from 1 to 30, and
   q represents an average number from 1 to 100,
   d) an organic zinc compound, and
   e) an organic calcium, magnesium, barium or lanthanide compound, or a mixture thereof.

17. The composition of claim 16 wherein in formula (I),
   R represents a methyl radical;
   R' represents a trimethylene or 2-methyltrimethylene radical;
   p represents an average number from 2 to 30; and
   q represents an average number from 2 to 30.

18. The composition of claim 16 wherein said organic zinc compound is a zinc carboxylate or zinc phenolate.

19. The composition claim 16 wherein said organic calcium, magnesium, barium and lanthanide compound or mixture thereof is of the carboxylate or phenolate form.

20. The composition of claim 16 further comprising at least β-diketone or one γ-keto aldehyde.

21. The composition of claim 13 wherein said β-diketone is present in the amount of from 0.005% to 5% by weight relative to the weight of the chlorinated polymer.

22. The composition of claim 15, wherein said 1,4-dihydro-2,6-dimethyl-3,5-pyridinedicarboxylate is present in the amount of from 0.01% to 5% by weight relative to the weight of the chlorinated polymer used.

* * * * *

UNITED STATES PATENT AND TRADEMARK OFFICE
CERTIFICATE OF CORRECTION

PATENT NO. : 5,143,959

DATED : September 01, 1992

INVENTOR(S) : Louis Carette et al.

It is certified that error appears in the above-identified patent and that said Letters Patent is hereby corrected as shown below:

Claim 3, column 9, line 45 change "'q" to --q--.

Claim 10, column 10, line 1, change "claim 1" to --claim 2--.

Claim 13, column 10, line 13, change "-62 -keto" to --β-keto--.

Claim 20, column 10, line 59, change "γ-keto --β-keto--.

Signed and Sealed this

Nineteenth Day of October, 1993

Attest:

BRUCE LEHMAN

Attesting Officer

Commissioner of Patents and Trademarks